US011436922B2

(12) United States Patent
Vadillo et al.

(10) Patent No.: US 11,436,922 B2
(45) Date of Patent: Sep. 6, 2022

(54) METHOD, SYSTEM AND EMERGENCY CONTROL DEVICE FOR TRAFFIC MANAGEMENT OF AUTONOMOUS VEHICLES IN EMERGENCY SITUATIONS

(71) Applicant: The Boeing Company, Chicago, IL (US)

(72) Inventors: Jaime Negro Vadillo, Madrid (ES); Grzegorz Marian Kawiecki, El Escorial (ES); David Esteban Campillo, Madrid (ES)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 16/550,126

(22) Filed: Aug. 23, 2019

(65) Prior Publication Data

US 2020/0066147 A1 Feb. 27, 2020

(30) Foreign Application Priority Data

Aug. 24, 2018 (EP) .................................... 18382623

(51) Int. Cl.
*G08G 1/08* (2006.01)
*G05D 1/00* (2006.01)
(Continued)

(52) U.S. Cl.
CPC ......... *G08G 1/0965* (2013.01); *B64C 39/024* (2013.01); *G05D 1/0088* (2013.01);
(Continued)

(58) Field of Classification Search
CPC ........... G08G 1/0965; G08G 1/096725; G08G 1/096758; G08G 1/096791; G08G 1/162;
(Continued)

(56) References Cited

U.S. PATENT DOCUMENTS 9,280,899 B2 * 3/2016 Biess .................... G08G 1/163
9,501,935 B2 * 11/2016 Kastner ................ B60W 30/09
(Continued)

FOREIGN PATENT DOCUMENTS

| EP | 2930581 A1 | 10/2015 |
| EP | 3370386 A1 | 9/2018 |
| WO | 2007091219 A1 | 8/2007 |

OTHER PUBLICATIONS

Caveney, Derek et al., Cooperative Driving: Beyond V2V as an ADAS sensor, 2012 Intelligent Vehicles Symposium, Alcala de Henares, Spain, Jun. 3-7, 2012, IEEE, pp. 529-534.

(Continued)

*Primary Examiner* — Yonel Beaulieu

(74) *Attorney, Agent, or Firm* — Kolisch Hartwell, P.C.

(57) ABSTRACT

A method for traffic management of autonomous vehicles in emergency situations is disclosed. Upon receipt of an emergency signal including information on an anomalous traffic condition by an autonomous vehicle, the method includes broadcasting the emergency signal using a wireless communication device. The method further includes establishing an ad hoc wireless network among a plurality of autonomous vehicles and exchanging data among the vehicles of the network. The method further includes collaboratively computing intent instructions for the vehicles of the network to avoid or mitigate the anomalous traffic condition, distributing the instructions among the vehicles of the network, and executing the instructions by each corresponding vehicle.

20 Claims, 10 Drawing Sheets

(51) Int. Cl.
| | |
|---|---|
| *B64C 39/02* | (2006.01) |
| *H04W 4/00* | (2018.01) |
| *H04W 4/02* | (2018.01) |
| *G08G 1/0965* | (2006.01) |
| *G05D 1/10* | (2006.01) |
| *H04W 84/18* | (2009.01) |
| *H04W 4/021* | (2018.01) |

(52) U.S. Cl.
CPC ............ *G05D 1/104* (2013.01); *H04W 4/022* (2013.01); *H04W 84/18* (2013.01); *B64C 2201/122* (2013.01)

(58) Field of Classification Search
CPC ............ G08G 1/166; G08G 1/22; G08G 1/00; G08G 1/16; B64C 39/024; B64C 2201/122; B64C 39/02; G05D 1/0088; G05D 1/104; G05D 2201/0213; G05D 1/0291; G05D 1/00; H04W 4/022; H04W 84/18; H04W 4/00
See application file for complete search history.

(56) References Cited

U.S. PATENT DOCUMENTS

| | | | |
|---|---|---|---|
| 9,802,614 B1 | 10/2017 | Yoon | |
| 10,049,581 B2* | 8/2018 | Yoon | G05D 1/021 |
| 10,262,234 B2* | 4/2019 | Li | G06K 9/66 |
| 10,328,935 B2* | 6/2019 | O'Dea | B60W 30/16 |
| 10,332,394 B2* | 6/2019 | Gomez Gutierrez | G08G 1/087 |
| 10,410,532 B1* | 9/2019 | Myr | G08G 5/006 |
| 10,717,528 B1* | 7/2020 | Tran | G05D 1/101 |
| 10,878,346 B2* | 12/2020 | Hsu | G08G 1/166 |
| 11,011,059 B2* | 5/2021 | Suzuki | B60W 30/12 |
| 11,017,665 B1* | 5/2021 | Roy | G08G 1/0965 |
| 11,025,377 B2* | 6/2021 | Rakib | H01Q 15/08 |
| 11,057,784 B2* | 7/2021 | Chang | H04W 24/02 |
| 11,086,327 B2* | 8/2021 | Sundar Pal | G01C 21/3461 |
| 11,118,929 B2* | 9/2021 | Coleman | G01C 21/3641 |
| 11,164,338 B2* | 11/2021 | Haglund | G06T 7/0002 |
| 2005/0015203 A1* | 1/2005 | Nishira | G08G 1/167 701/301 |
| 2005/0256630 A1* | 11/2005 | Nishira | G08G 1/167 701/96 |
| 2010/0202346 A1* | 8/2010 | Sitzes | H04W 12/121 370/328 |
| 2014/0074356 A1* | 3/2014 | Bone | G08G 1/167 701/41 |
| 2015/0294564 A1 | 10/2015 | Villar et al. | |
| 2017/0249839 A1* | 8/2017 | Becker | H04W 4/90 |
| 2018/0376305 A1* | 12/2018 | Ramalho de Oliveira | G08G 1/096775 |
| 2020/0294401 A1* | 9/2020 | Kerecsen | G05D 1/0287 |
| 2020/0344820 A1* | 10/2020 | Fowe | H04W 76/10 |
| 2021/0064057 A1* | 3/2021 | Eldar | G08G 1/167 |
| 2021/0271249 A1* | 9/2021 | Kobashi | B60W 30/18163 |

OTHER PUBLICATIONS

European Patent Office, Partial European Search Report regarding European Patent Application No. 18382623.9-1204, dated Mar. 8, 2019, 15 pages.

European Patent Office, European Search Report regarding European Patent Application No. 18382623.9-1204, dated Jun. 14, 2019, 6 pages.

Rae A. and Basir O., 2007, "A Framework for Visual Position Estimation for Motor Vehicles," 4th Workshop on Positioning, Navigation and Communication, Hannover, Germany.

Shuhaimi N. I. and Juhana, T., 2012, "Security in Vehicular Ad-Hoc Network with Identity-Based Cryptography Approach: A Survey," Proceedings of 7th International Conference on Telecommunication Systems, Services and Applications, Dec. 3, Bali, Indonesia.

Abumansoor, O. and Boukerche, A., 2012, "A Secure Cooperative Approach for Nonline-of-Sight Location Verification in VANET," IEEE Transactions on Vehicular Technology, vol. 61, No. 1, Jan. 2012.

Badder C. S., Zanchi M. R. and Lauf A., 2013, "Collaborative Ad hoc Aerial Reconnaissance Platform," IEEE Military Communications Conference.

Simic M. N., 2013, "Vehicular Ad Hoc Networks," Proceedings of TELSIKS, Oct. 10 16-19, Nis, Serbia.

Churchill S., 2013, "Cellphones Get Direct, Device-to-Device Communications,"http://www.dailywireless.org/2013/02/14/cellphones-get-directdevice-to-device-communications/.

Magnano A., Fei X. and Boukerche A., 2015, "Movement Prediction in Vehicular Networks".

Lin, X. and Lu, R., 2015, "Vehicular Ad Hoc Network Security and Privacy," First 25 Edition, Chapter 9 "Fast Handover Authentication Based on Mobility Prediction," Wiley&Sons.

Jann M., Anavatti S. and Biswass S., 2017, "Path Planning for Multi-Vehicle Autonomous Swarms in Dynamic Environment," Ninth International Conference on Advanced Computational Intelligence, Feb. 4-6, Doha, Qatar.

Zhao X., Zhao H., Chen Y.-H. and Dong F., 2017, "Collision Avoidance Adaptive Robust Control for Autonomous Vehicles: Motivated by Swarm Properties," 29th Chinese Control and Decision Conference.

* cited by examiner

METHOD, SYSTEM AND EMERGENCY CONTROL DEVICE FOR TRAFFIC MANAGEMENT OF AUTONOMOUS VEHICLES IN EMERGENCY SITUATIONS

BACKGROUND

There is a large body of research on methods of controlling groups of vehicles (also referred to as "swarms"). Possible methods of managing the communication among Unmanned Aerial Vehicles swarm members, and movement prediction in vehicular networks have both been addressed to some degree.

A breach in the integrity of a collaborative network set up among participating vehicles can have negative consequences. Therefore, there is a need to solve the problem of securely and efficiently managing the traffic of autonomous vehicles, particularly in emergency situations.

SUMMARY

The present disclosure refers to a method, a system and an emergency control device for traffic management of autonomous vehicles in emergency situations. In some examples a method may include, upon reception by an autonomous vehicle of an emergency signal including information on an anomalous traffic condition, broadcasting the emergency signal using a wireless communication device. The method may further include establishing a wireless ad hoc network among a plurality of autonomous vehicles receiving the emergency signal, and exchanging data among the autonomous vehicles of the network. The exchanged data may at least include on-board sensor data and intent of each autonomous vehicle of the network. The method may further include collaboratively computing, by the autonomous vehicles of the network, intent instructions for each of the autonomous vehicles of the network to avoid or mitigate the anomalous traffic condition. The method may further include distributing the intent instructions among the autonomous vehicles of the network and executing, by each autonomous vehicle of the network, the corresponding intent instructions.

In some examples, a system for traffic management of autonomous vehicles in emergency situations may include a plurality of emergency devices, each device adapted to be installed on-board an autonomous vehicle. Each control device may be equipped with a wireless communication module, an intent description language module, and a control unit. The control unit may be configured to, upon reception of an emergency signal including information related to an anomalous traffic condition, broadcast the emergency signal using the wireless communication module. The control unit may be further configured to establish a wireless ad hoc network with those emergency control devices of the plurality of emergency control devices which are receiving the emergency signal, and exchange data with the rest of the emergency control devices on the network. The exchanged data may at least include on-board sensor data and intent of the autonomous vehicle. The control unit may be further configured to collaboratively compute, with the rest of the emergency control devices of the network, intent instructions for each autonomous vehicle to avoid or mitigate the anomalous traffic condition. The control unit may be further configured to distribute the computed intent instructions to the rest of the emergency control devices of the network and upon reception of intent instructions for the corresponding autonomous vehicle, decode said instructions using the intent description language module and execute the decoded intent instructions.

In some examples, an emergency control device for traffic management of autonomous vehicles in emergency situations, adapted to be installed on-board an autonomous vehicle, may include a wireless communication module, an intent description language module, and a control unit. The control unit may be configured to, upon reception of an emergency signal including information related to an anomalous traffic condition, broadcast the emergency signal using the wireless communication module. The control unit may be further configured to establish a wireless ad hoc network with other emergency control devices receiving the emergency signal, and exchange data with the rest of the emergency control devices on the network. The exchanged data may include at least on-board sensor data and intent of the autonomous vehicle. The control unit may be further configured to collaboratively compute, with the rest of the emergency control devices of the network, intent instructions for each autonomous vehicle of the network to avoid or mitigate the anomalous traffic condition. The control unit may be further configured to distribute the computed intent instructions to the rest of the emergency control devices of the network and upon reception of intent instructions, decode said instructions using the intent description language module and execute the decoded intent instructions.

The features, functions, and advantages that have been discussed can be achieved independently in various examples or may be combined in yet other examples further details of which can be seen with reference to the following description and drawings.

DETAILED DESCRIPTION

In general, a method of traffic management of autonomous vehicles in an emergency may include establishing a wireless ad hoc network among cooperating vehicles to exchange data and collaboratively compute intent instructions for each vehicle.

Technical solutions are disclosed herein for secure communication over such a wireless ad hoc network, and for collaborative computation, distribution, and execution of intent instructions to mitigate an anomalous traffic condition. Specifically, the disclosed system/method addresses a technical problem tied to autonomous vehicles and arising in the realm of wireless communication, namely the technical problem of secure communication and coordinated behavior between autonomous vehicles. The system and method disclosed herein solve this technical problem by authenticating cooperating vehicles using physical and digital signatures of associated components, and by determining trajectory modifications based on a level of impact of the emergency situation, among other solutions. Accordingly, the disclosed systems and methods do not merely recite the performance of some known practice along with the requirement to perform it with an autonomous vehicle. Rather, they provide a solution necessarily rooted in computer network technology to overcome a problem specifically arising in the realm of autonomous vehicles.

The following sections describe selected aspects of exemplary methods of managing autonomous vehicles in emergency traffic situations as well as related systems and/or methods. The examples in these sections are intended for illustration and should not be interpreted as limiting the entire scope of the present disclosure. Each section may include one or more distinct examples, and/or contextual or related information, function, and/or structure.

Figure 1:
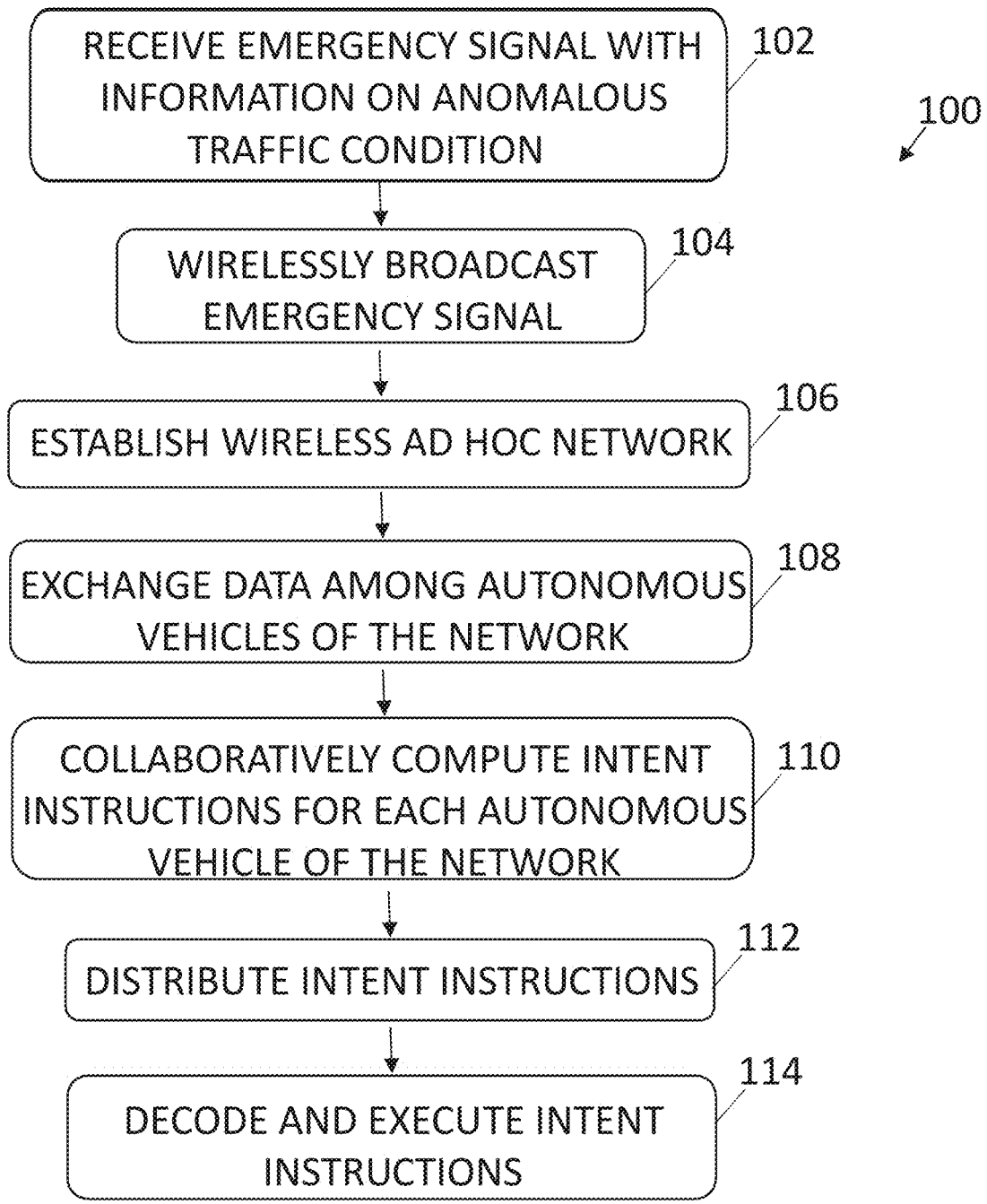
FIG. 1 is a flow diagram depicting steps of an illustrative method for securely and efficiently managing autonomous vehicles in emergency traffic situations.

FIG. 1 depicts the steps of an illustrative method 100 for securely and efficiently managing autonomous vehicles in emergency traffic situations. The present implementation of the method is based on known control commands a given vehicle will execute to solve a traffic contingency. Knowing these commands, some vehicle's parameters and, optionally, environmental conditions such as road surface or wind parameters, the position of each vehicle can be predicted far better than just by extrapolating the known trajectory or behavior.

When an autonomous vehicle receives 102 an emergency signal or emergency alert including emergency-related information, said autonomous vehicle wirelessly broadcasts 104 the emergency signal using a wireless communication device installed on-board. The emergency-related information normally refers to information on an anomalous traffic condition, such as a traffic accident or traffic jam, but it may also refer other kind of alerts, such as weather alerts (e.g. a tornado), which may cause an anomalous traffic condition. This way, when referring to "information on anomalous traffic condition", this information may refer to an anomalous traffic condition or to any kind of emergency which may cause an anomalous traffic condition, such as a weather alert.

A wireless ad hoc network among a plurality of autonomous vehicles receiving the emergency signal is then established 106, allowing a group of autonomous vehicles to exchange data. Different known communication systems and protocols may be employed to establish a wireless network, such as a Vehicular Ad Hoc Network, a Mobile Ad Hoc Network and/or direct device-to-device communication. This communication system helps, in this case, to collaboratively avoid or at least mitigate a traffic contingency (i.e. anomalous traffic condition or traffic situation).

The autonomous vehicles of the network exchange data 108 using the newly established ad hoc network. The exchanged data at least includes data acquired by on-board sensors and the intent of each autonomous vehicle of the network. Depending on each particular example, the data exchanged among the autonomous vehicles of the network may include different data, such as the position and/or velocity of each autonomous vehicle, the vehicle status (e.g., an ambulance responding to an emergency), mechanical parameters of each autonomous vehicle, external data obtained from an external service or a remote server (e.g. commercial weather information), or a combination thereof.

Environmental information may also be exchanged among network nodes (i.e. among the autonomous vehicles forming the network). The environmental information is acquired by one or more sensors (e.g. one or more cameras, proximity sensors), and may include obstacles and/or vehicles detected by the sensors, current visibility, road surface condition, etc.

Once the data has been distributed, the autonomous vehicles of the network collaboratively compute 110 intent instructions for each autonomous vehicle of the network to try to avoid or at least mitigate the anomalous traffic condition. Intent instructions are operations to be sequentially performed by the autonomous vehicle to follow a determined trajectory, where the operations are expressed using a formal language, an intent description language, such as the Terrestrial Intent Description Language (TIDL) disclosed in patent documents EP2930581-A1 and US2015294564-A1, entitled "System and Method for Surface Vehicle Trajectory Description" and issued as U.S. Pat. No. 9,773,415 on Sep. 26, 2017, the disclosures of which are herein incorporated by reference in their entirety.

The collaborative computation of intent instructions may include determining distributed computational tasks to be performed by each autonomous vehicle of the network to optimize speed and reliability of the solution. The data exchanged among the network nodes in step 108 may include relevant network characteristics, such as computational and communications performance of each autonomous vehicle of the network. This data will be helpful for determining distributed computational tasks of each network vehicle, as part of the collaborative computation of intent instructions. In other words, the computational tasks are distributed among the autonomous vehicles of the network taking into account the reported computational and communications capabilities of each autonomous vehicle of the network and the expected solution reliability (e.g. possible introduction of redundancies in order to increase the probability of success, if the associated time delay is acceptable).

The computed intent instructions are distributed 112 among the autonomous vehicles of the network. Each autonomous vehicle of the network decodes (since they are expressed using a formal language) and executes 114 the corresponding intent instructions (i.e., the intent instructions computed for said vehicle).

The collaborative computation of intent instructions may include negotiating trajectory modifications among the autonomous vehicles of the network, and translating the negotiated trajectory modifications for each autonomous vehicle of the network into operations coded using an intent description language.

Figure 2:
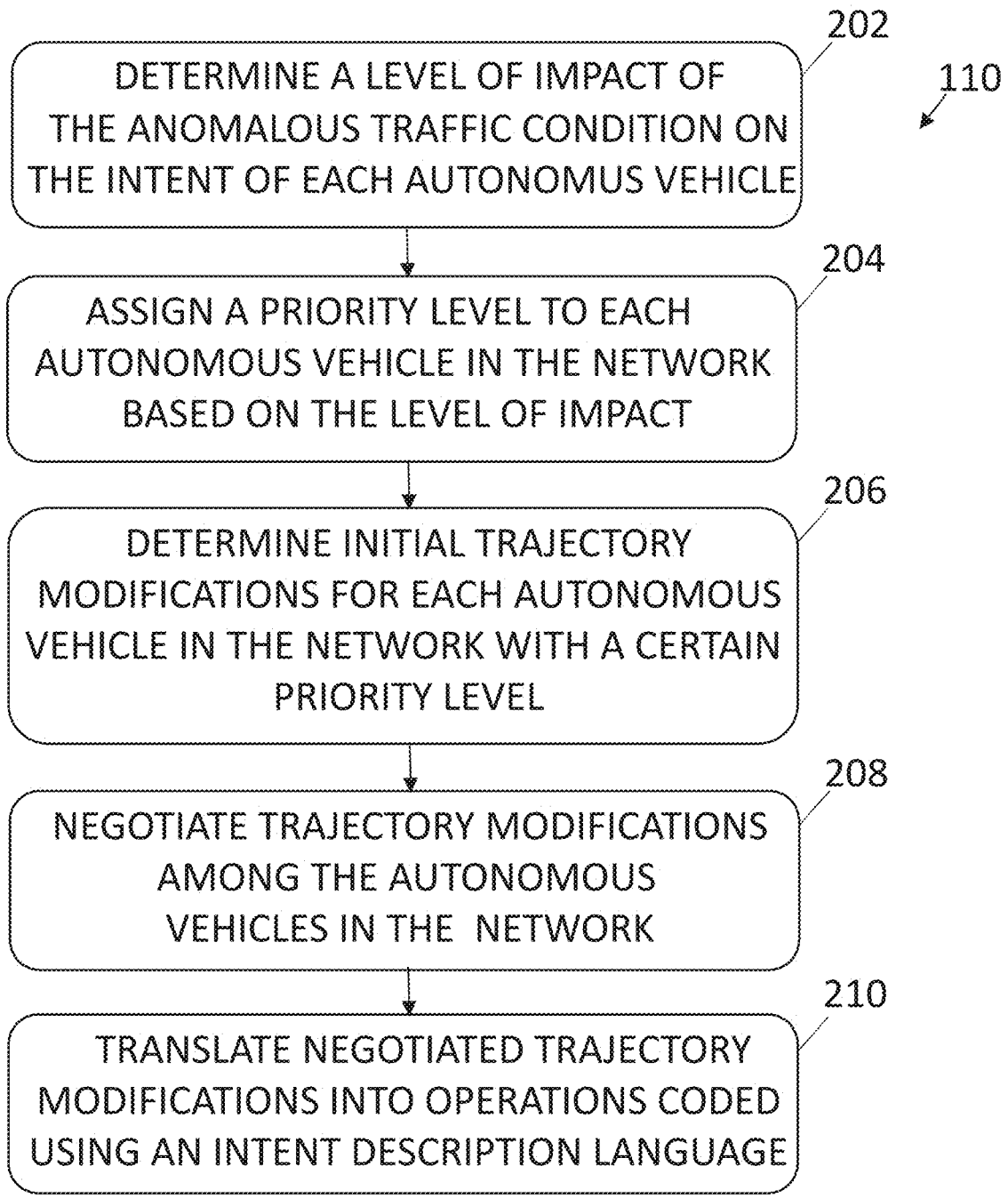
FIG. 2 is a flow diagram depicting steps of the collaborative computation performed in the method of FIG. 1.

FIG. 2 depicts a flow diagram of illustrative collaborative computation steps, as described above. In a first step 202, a level of impact of the anomalous traffic condition is determined for each autonomous vehicle of the network. To that end, it is checked whether the intent of each autonomous vehicle is going to be affected, and to what degree, by the anomalous traffic condition. For instance, if the emergency situation is an accident blocking the right lane of a two-lane road, an autonomous vehicle driving on the left lane will be affected less compared to an autonomous vehicle driving on the right lane, since the latter will at least need to change lane (in addition, both vehicles will probably be instructed to reduce speed). Some traffic situations may even not affect certain autonomous vehicles; in that case, the level of impact will be zero for those vehicles.

Based on the level of impact, a priority level is assigned 204 to each autonomous vehicle in the network. Initial trajectory modifications are computed 206 for each autonomous vehicle in the network with a certain priority level, normally the autonomous vehicles with highest priority level (for example, in a case where three levels of priority have been defined —priority level 1, 2 and 3-, the vehicles with priority level 3) or the autonomous vehicles with a priority level equal or higher than a threshold (e.g., autonomous vehicles with priority level equal or higher than 2).

Therefore, the computed initial trajectory modifications will only apply to those vehicles most affected by the anomalous traffic condition. In the previous example, an accident blocking the right lane of a two-lane road, the autonomous vehicles driving on the right lane and located closer to the accident will have the highest priority, since they will be highly affected by the emergency situation. These vehicles need to rapidly change lanes. Other vehicles driving on the right lane but located farther from the accident may have a lower priority level assigned, since they need to change lane but they have more time (and space) available to execute the maneuver. Vehicles driving on the left lane are not required to change lane, and therefore the priority level assigned will normally be lower than those vehicles driving on the right lane.

Starting with the initial trajectory modifications already computed for the vehicles with a certain priority level, trajectory modifications are negotiated 208 among the autonomous vehicles in the network to avoid or minimize the effects of the anomalous traffic condition. The negotiated trajectory modifications may be performed globally, considering all the autonomous vehicles of the network (i.e. an overall negotiation), or in different steps considering different priority levels (i.e. several negotiations, each negotiation including vehicles of a lower priority level). As an example for the latter case, when having three priority levels the initial trajectory modifications may correspond to the autonomous vehicles having highest priority level (i.e. level 3), and the first negotiation may be performed between autonomous vehicles with priority level 3 and the following lower priority level (i.e. priority level 2). When the autonomous vehicles involved (priority level 2 and 3) agree on a set of trajectory modifications for said autonomous vehicles, the next step of the negotiations will include the autonomous vehicles with lowest priority level (i.e. priority level 1).

It is, therefore, understood that the initial trajectory modifications will correspond to a coarse adjustment for the updated trajectories of the autonomous vehicles most affected by the traffic situation, whereas the negotiation between network vehicles will deliver a fine adjustment to said updated trajectories, along with agreed trajectory modifications for those autonomous vehicles with lower priority level. Once the negotiation is finished, the trajectory modifications negotiated for each autonomous vehicle of the network are translated 210 into operations or instructions coded using an intent description language.

Figure 3:
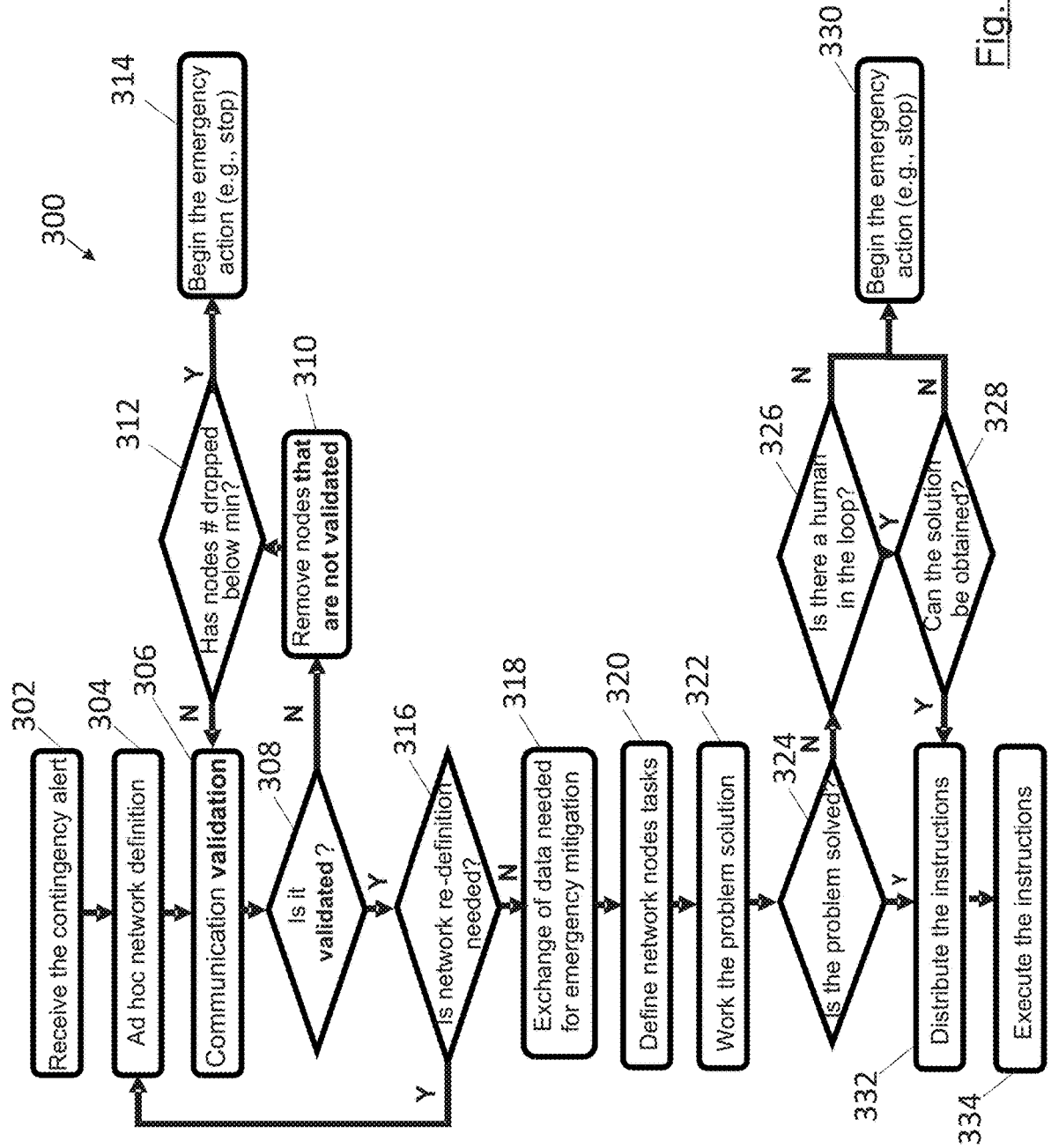
FIG. 3 is a flow diagram depicting steps of another illustrative method for traffic management of autonomous vehicles in emergency situations.

FIG. 3 represents, in more detail, a flow diagram of an illustrative method 300 for traffic management of autonomous vehicles in emergency situations. After a traffic contingency alert is received 302, an ad-hoc network is established 304.

Figure 6:
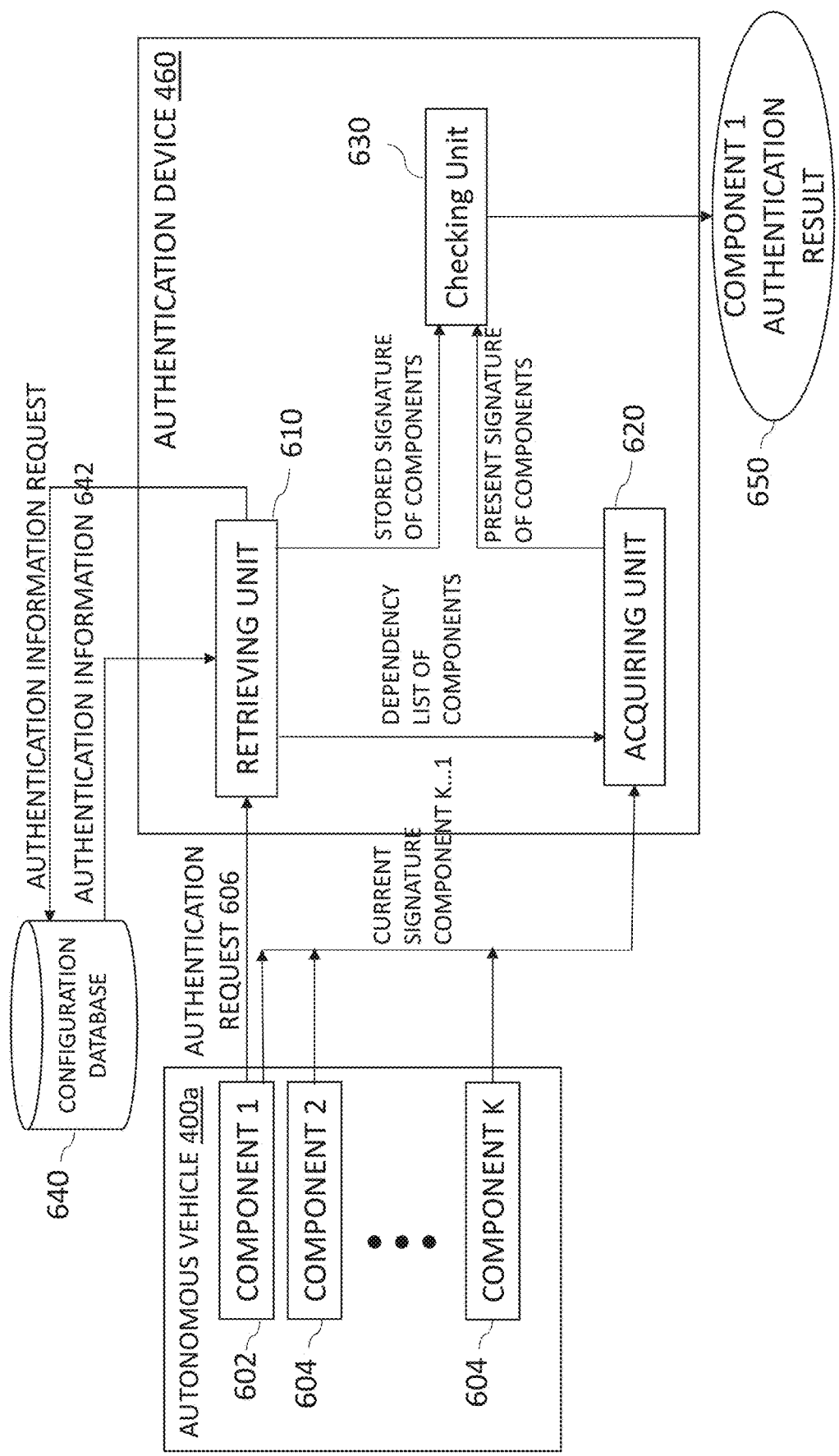
FIG. 6 is a schematic diagram of the authentication device used for establishing secure communication among the vehicles of the network of the application of FIG. 5A.

The establishing of an ad hoc network may include a communication validation 306 comprising authenticating the autonomous vehicles receiving the emergency signal (the elements of the authentication system is explained in detail in FIG. 6) and determining 308, among the authenticated autonomous vehicles, validated autonomous vehicles that are capable of contributing to the collaborative computation to avoid or mitigate the traffic contingency. The nodes of the wireless ad hoc network are the validated autonomous vehicles. The nodes that have not been validated are removed 310 from the network. If the number of nodes drops below a threshold 312, an emergency action for the current network nodes may be activated 314 (e.g. stop the autonomous vehicles).

In step 316, it is checked whether network redefinition is needed. This is achieved, for instance, by repeatedly checking availability of all the autonomous vehicles forming the wireless ad hoc network and if one or more autonomous vehicles of the network become temporarily unavailable, updating the wireless ad hoc network to include only the autonomous vehicles available as participating nodes of the network.

Data needed for emergency mitigation is then exchanged 318 among the network nodes, the tasks for each network node are defined 320 and the solution to the problem is worked 322. The combined computational and communications capabilities of the network is applied to generate a situational picture, by estimating the type of encountered hazards (e.g. a broken car on the road shoulder, an uncooperative vehicle or a big pothole) and estimating the priority level for each network node, checking whether a given vehicle is directly affected by the traffic situation, e.g., will it have to change lanes.

The solution may also depend on the status of the vehicle (e.g., if a vehicle is an ambulance and is responding to a call, the priority assigned to the vehicle will be higher). Non-validated nodes cannot be used to contribute to the collaborative computational effort, but data from sensors of vehicles that are not validated but positively authenticated (e.g., those vehicles that move too fast) may be used to generate the situational picture.

The solution is obtained in terms of intent instructions for each of network nodes. In 324 it is checked whether a solution to the problem is found. If there is no solution (e.g. the process took too long, the highly nonlinear problem has no solution, etc.), a check is done to try to pass the control to a person 326. If there is no person or the person cannot obtain a solution 328, an emergency action is initiated 330 (e.g., slow down and/or stop).

If a solution is found, the instructions are distributed 332 to each network node and then executed 334.

Figure 4:
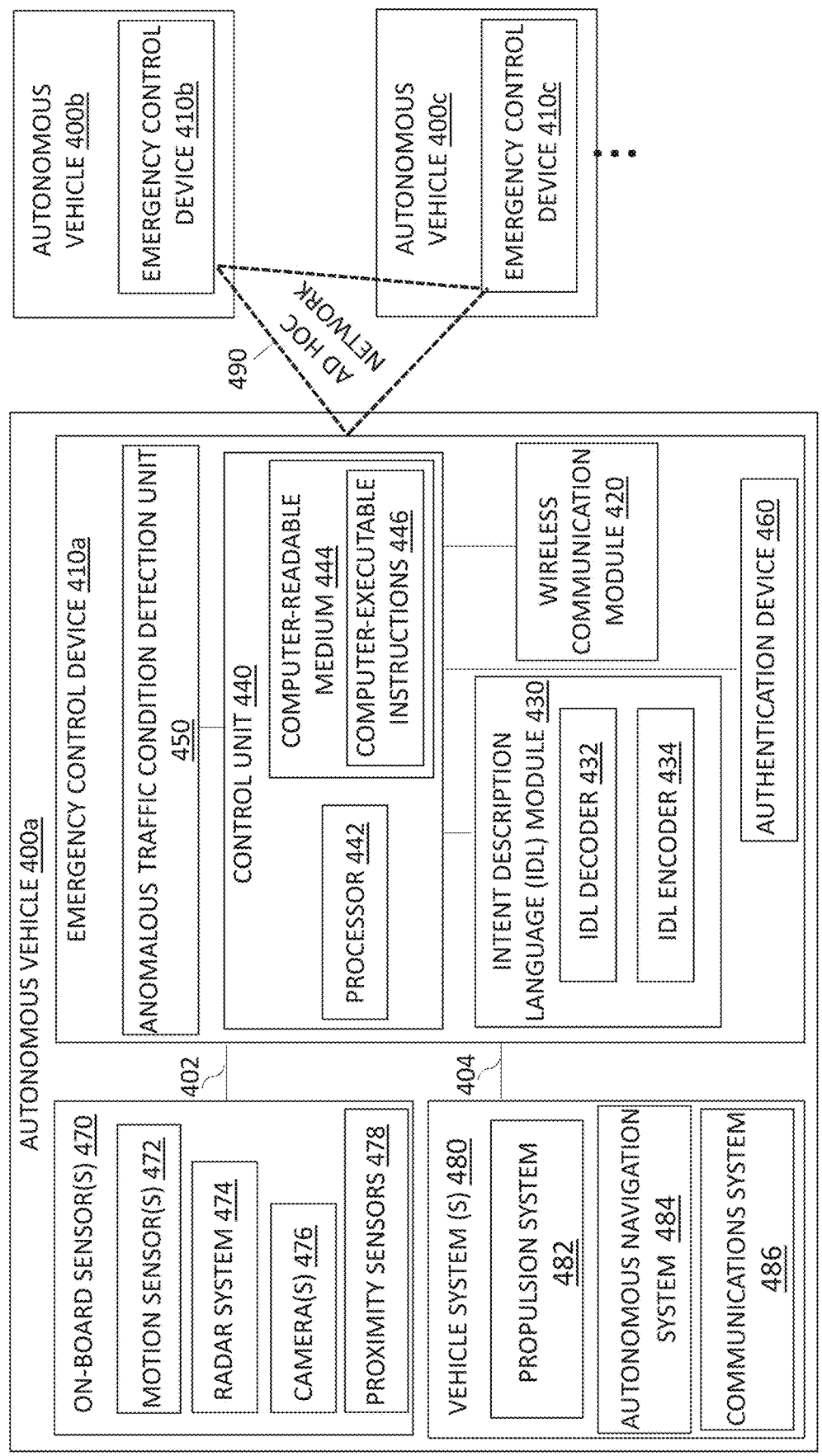
FIG. 4 is a schematic diagram of an illustrative system for traffic management of autonomous vehicles in emergency situations.

FIG. 4 depicts a schematic view of an illustrative system for traffic management of autonomous vehicles in emergency situations. The system includes a plurality of emergency control devices (410a, 410b, 410c), each device configured to be installed on-board a corresponding autonomous vehicle (400a, 400b, 400c). Each emergency control device (410a, 410b, 410c) is equipped with a wireless communication module 420, an intent description language module 430 and a control unit 440 configured to perform the steps of the method previously described. The detailed components of each emergency control device are only shown for emergency control device 410a. Similarly, detailed systems on-board an autonomous vehicles is only represented for autonomous vehicle 400a.

In particular, the control unit 440 of each emergency control device (410a, 410b, 410c) includes a processor 442 and a computer-readable medium 444 having encoded thereon computer-executable instructions 446 to cause the processor to:

- Upon reception of an emergency signal including emergency-related information, broadcast the emergency signal using the wireless communication module 420.
- Establish a wireless ad hoc network 490 with the rest emergency control devices (410b, 410c) receiving the emergency signal.
- Exchange data with the rest of the emergency control devices (410b, 410c) of the network, the exchanged data at least including on-board sensor data acquired by one or more on-board sensors 470 and intent of the autonomous vehicle provided by an autonomous navigation system 484 of the corresponding autonomous vehicle 400a.
- Collaboratively compute, with the rest of emergency control devices (410b, 410c) of the network, intent instructions for each autonomous vehicle to mitigate the anomalous traffic condition.
- Distribute the computed intent instructions to the rest of emergency control devices (410b, 410c) of the network;
- Upon reception of intent instructions for the corresponding autonomous vehicle 400a, decoding said instructions using the intent description language module 430 (in particular, using an intent description decoder 432).
- Execute the decoded intent instructions on the corresponding autonomous vehicle 400a.

The emergency control device 410a (and also the rest of emergency control devices 410b, 410c) is in signal communication with the one or more on-board sensors 470, and one or more vehicle systems 480 via signal paths 402 and 404, respectively. The on-board sensors 470 may include, among others, one or more motion sensors 472, a radar system 474, one or more cameras 476, and/or proximity sensors 478. The vehicle systems 480 may include the propulsion system 482 of the autonomous vehicle 400a, the autonomous navigation system 484, the communications system 486, etc.

To execute the decoded intent instructions (which includes vehicle operations required to follow an updated trajectory) on the corresponding autonomous vehicle 400a, the control unit 440 sends the decoded operations to a system of the autonomous vehicle 400a, for instance to the autonomous navigation system 484 or directly to the propulsion system 482.

The anomalous traffic condition may be detected by an external entity (e.g., traffic officers) and wirelessly reported, embedded in an emergency signal, to a first emergency control device 410a using an electronic system/device. For instance, the emergency control device 410a may receive the emergency signal thorough the communications system 486, such as a cellular communication module, of the autonomous vehicle 400a. Alternatively, the emergency control device 410a may directly receive the emergency signal through the wireless communication module 420.

In another example, the anomalous traffic condition may be detected by the emergency control device 410a itself. To that end, the emergency control device 410a further includes an anomalous traffic condition detection unit 450 configured to detect an anomalous traffic condition. For instance, the anomalous traffic condition detection unit 450 may be configured to receive and analyze the data captured by on-board sensors (e.g. camera 476, proximity sensors 478) to detect an abnormal situation in the traffic (e.g. an accident, a car broken down, a traffic jam) or in the autonomous vehicle itself (e.g. a breakdown reported by the Electronic Control Unit of the autonomous vehicle). The control unit 440 of the emergency control device 410a is further configured to wirelessly transmit an emergency signal including information related to the anomalous traffic condition detected by the anomalous traffic condition detection unit 450.

The emergency control device 410a may further include one or more sensors (e.g. cameras, proximity sensors) configured to acquire environmental information, such as detected obstacles, detected vehicles, current visibility, road surface condition. In that case, the data exchanged with the rest of the emergency control devices (410b, 410c) of the network also includes the environmental information acquired.

FIGS. 5A, 5B, 5C, 5D and 5E present an illustrative application of the system and method detailed above. In the example depicted in these figures, the traffic emergency is a broken-down, stationary and cooperative vehicle 502 (marked as vehicle A) located in a GPS-denied area (a tunnel 504 with a one-way, two-lane roadway 506). Cooperative vehicles are those vehicles equipped with an emergency control device as previously defined to implement the method of the invention. On the contrary, non-cooperative vehicles are not equipped with the emergency control device disclosed in the present invention, and therefore they are not considered when establishing the ad hoc network.

The broken down vehicle 502 partially blocks one of the lanes (the right lane), thus forcing the incoming traffic to use the other lane (the left lane) or to perform an emergency stop, if unable to do so. There are four autonomous vehicles 508 (marked as vehicles B, C, D and E) approaching the blocked lane area. Autonomous vehicle B is already in the tunnel 504 and receives an emergency signal 510 from the broken down vehicle 502. The interior of the tunnel 504 is uncongested, so autonomous vehicle B will have no problem with executing a safe lane change operation.

Autonomous vehicle B also re-transmits the contingency alert (i.e., the emergency signal 510) to any vehicle outside the tunnel 504, to increase the situational awareness of any vehicles approaching the dangerous area, and within the range of the signal. In this particular example, there are three other autonomous vehicles 508 (vehicles C, D and E) within the range of the wireless communication system. Autonomous vehicle C needs to change lane, but it is blocked by two other vehicles of the network, autonomous vehicle D and autonomous vehicle E, the latter currently in the process of overtaking autonomous vehicle C.

Autonomous vehicles C, D and E establish a wireless ad hoc network (using secure communication, which will be later explained in detail) and exchange information needed to solve the problem. Exemplary exchanged data include vehicular parameters (e.g. intent, position, velocity) and environmental information such as boundary conditions, obstacles, high risk areas, detected non-cooperative vehicles, visibility and detected road surface conditions. Optionally, a network of infrastructure RF markers 512 provide aid to the vehicles, broadcasting RF data 514 to obtain their current position in a GPS-denied environment, such as the area inside the tunnel 504.

The participating vehicles autonomously define the distributed computational tasks and solve the problem at hand, negotiating the necessary trajectory modifications and translating the trajectory modifications to instructions expressed in an intent description language (such as the Terrestrial Intent Description Language, TIDL, disclosed in patent document EP2930581-A) needed to be executed to follow the updated trajectory. These instructions are distributed to the control systems of participating vehicles/nodes, which trigger vehicle control operations expected to solve this particular emergency.

Figure 5A:
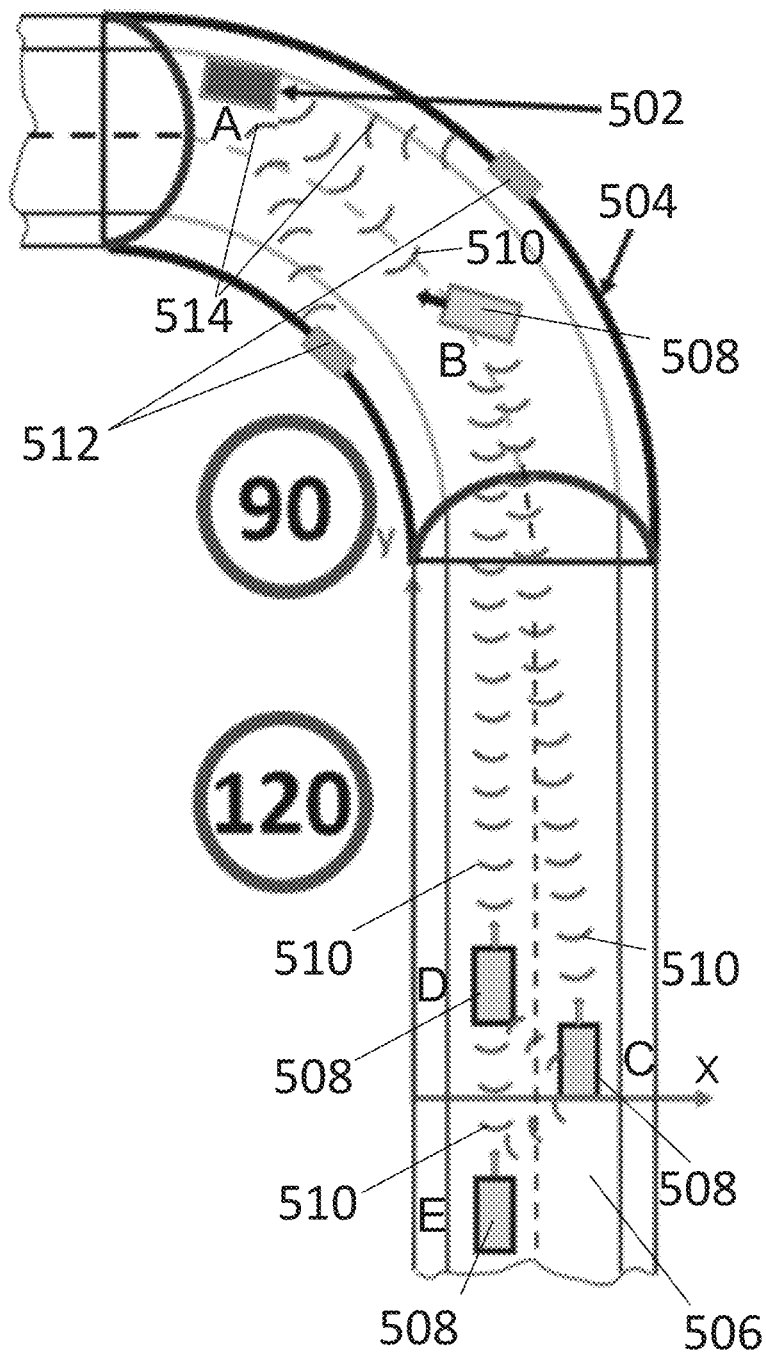
FIG. 5A is a schematic diagram of an exemplary application of the illustrative system of FIG. 4 and the illustrative method of FIG. 3, showing the initial configuration.
Figure 5B:
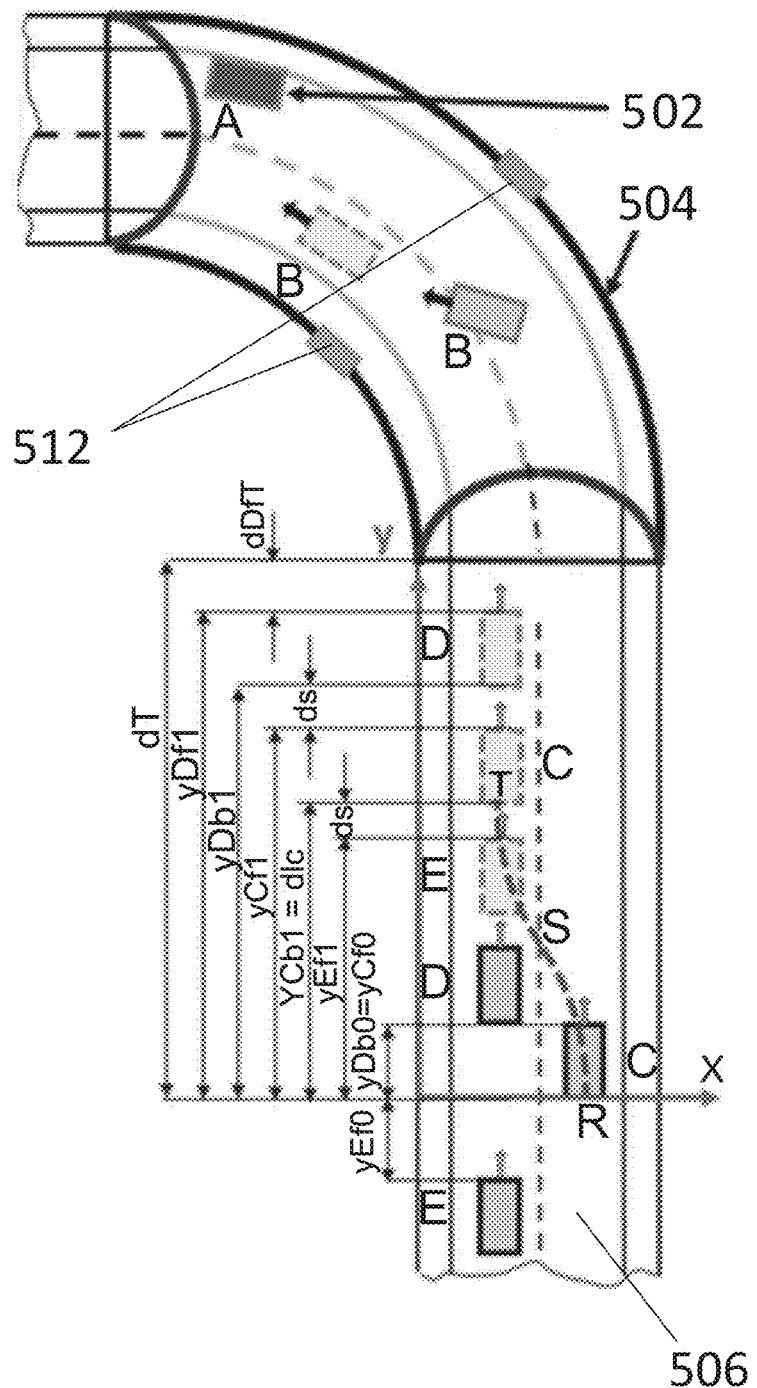
FIG. 5B is a schematic diagram of the application of FIG. 5A, showing the negotiated solution.
Figure 5C:
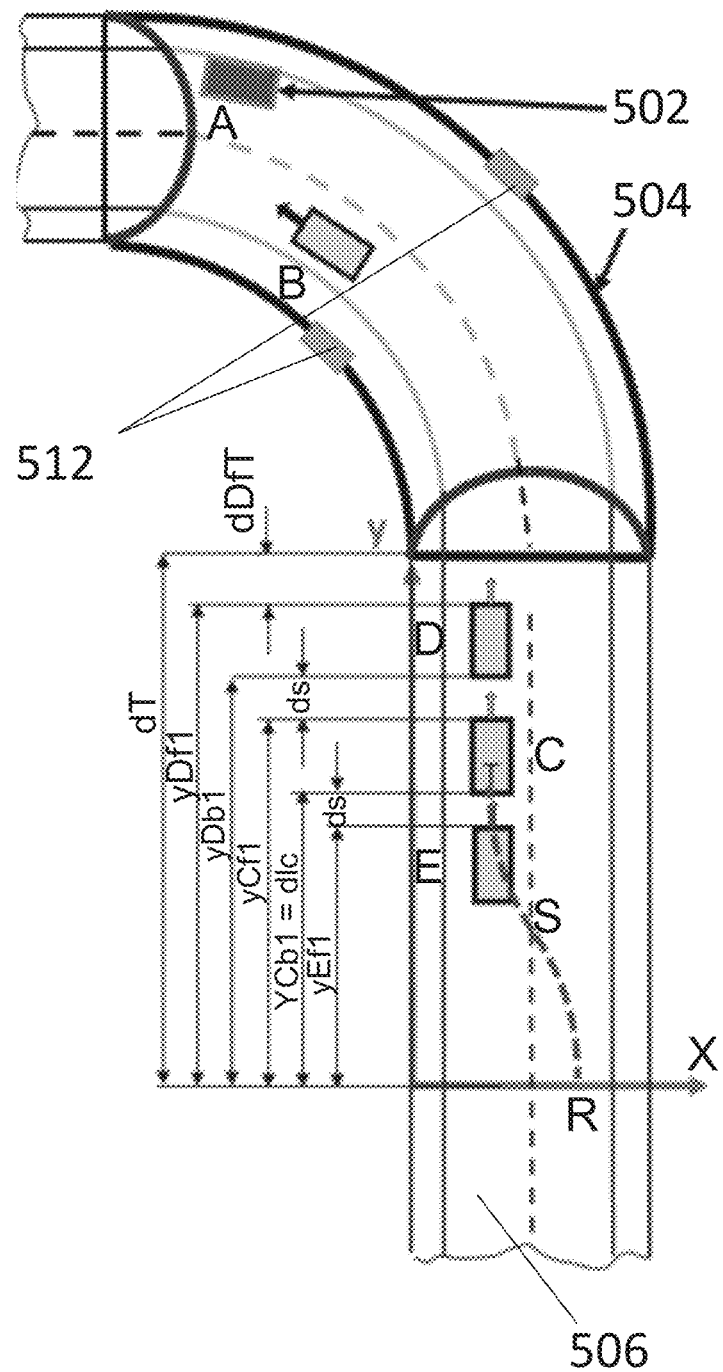
FIG. 5C is a schematic diagram of the application of FIG. 5A, showing the final configuration (i.e. resolution of the traffic contingency).

An exemplary solution of this particular case, obtained by the disclosed system, is shown in FIG. 5B. Autonomous vehicle E needs to reduce its velocity, in order to provide space for autonomous vehicle C to merge safely into the lane occupied by autonomous vehicle E. For the same reason, autonomous vehicle D needs to briefly accelerate, and then to brake, in order to enter the tunnel without exceeding the speed limit. The final configuration resulting from the collaborative surface trajectory effort is shown in FIG. 5C. All the three autonomous vehicles C, D and E are in the left lane, free of obstacles, at a safe distance (ds) one from another, travelling with the maximum velocity allowed in the tunnel (i.e., at 90 km/h).

This solution would be achieved through the application of the following Terrestrial Intent Description Language (TIDL) instructions computed and negotiated among the participating vehicles. These instructions are obtained using rigid body motion equations of the participating vehicles, for the following system parameters:

anUMS=0.2 (m/s$^2$): assumed max acceleration normal to curved trajectory RST.
 cDCE=0.3 (non): drag coefficient for vehicles C and E.
 cDD=1.0 (non): drag coefficient of vehicle D.
 dsUM=lvUM (m): assumed min. safety distance between vehicles after merging.
 faUN[HT]=(qmaxUNM*HT)/rwUM (N): propulsive force, in terms of motor torque transferred to the wheels, being a 0<HT<1 fraction of max. torque qmaxUNM.
 hvUM=1.6 (m): assumed vehicle height.
 lvUM=5 (m): assumed vehicle length.
 mvUK=1.8*10$^3$ (kg): assumed vehicle mass.
 rhoUKM=1.2 (kg/m$^3$): air density.
 rwUM=0.45 (m): vehicle wheel radius.
 RminUM=6.0 (m): min. turning radius.
 qmaxUNM=450.0 (Nm): max motor torque.
 wlUM=1.0 (m): assumed lane width.
 wvUM=1.8 (m): assumed vehicle width.
 vCUMS=vtmaxUMS=90.0/3.6 (m/s): assumed constant velocity of vehicle C in the Right lane and the max allowed velocity in the tunnel.
 vEOUMS=100.0/3.6 (m/s): assumed initial velocity of vehicle E in the Left lane.
 vDOUMS=93.0/3.6 (m/s): assumed initial velocity of vehicle D in the Left lane.
 vemaxUMS=120.0/3.6 (m/s): max allowed velocity on the expressway.
 vtmaxUMS=90.9/3.6 (m/s): max allowed velocity in the tunnel.
 yCb0=0 (m): initial position of vehicle C back.
 yCb1=158 (m): final position of vehicle C back (after 6.3 s).
 yEf0=−13 (m): initial position of vehicle E front.
 yEf1=153 (m): final position of vehicle E front.
 yDb0=5 (m): initial position of vehicle's D back.
 yDb1=168 (m): final position of vehicle D back.
 dDfT=25 (m): the distance available for vehicle "D" to decelerate to vtmaxUMS (max velocity in the tunnel) without exceeding the max deceleration magnitude.
 dT=198 (m): total distance from the origin of the system of coordinates to tunnel entrance, at the instant of reception of the contingency alert.

The solution negotiated among autonomous vehicles C, D and E defines the instructions needed to perform a number of actions required for the autonomous vehicle C to merge into the lane occupied by autonomous vehicles D and E within the available distance and maintaining the required safe distances of lvUM=5 m between vehicles, and adjusting speeds, so that all the vehicles enter the tunnel 504 without exceeding the speed limit of 90 km/h.

All of the autonomous vehicles 508 weigh 1.8*10$^3$ kg and have motors capable of developing max torque of 450 Nm. Autonomous vehicles C and E have coefficients of aerodynamic resistance of cD=0.3. Vehicle's D air resistance coefficient is equal to 1.0. The contingency alert is received when the front of autonomous vehicle C is at a distance of 193 m from the entrance to the tunnel 504. The maximum centrifugal acceleration while changing lanes cannot exceed 0.8 m/s$^2$.

Figure 5D:
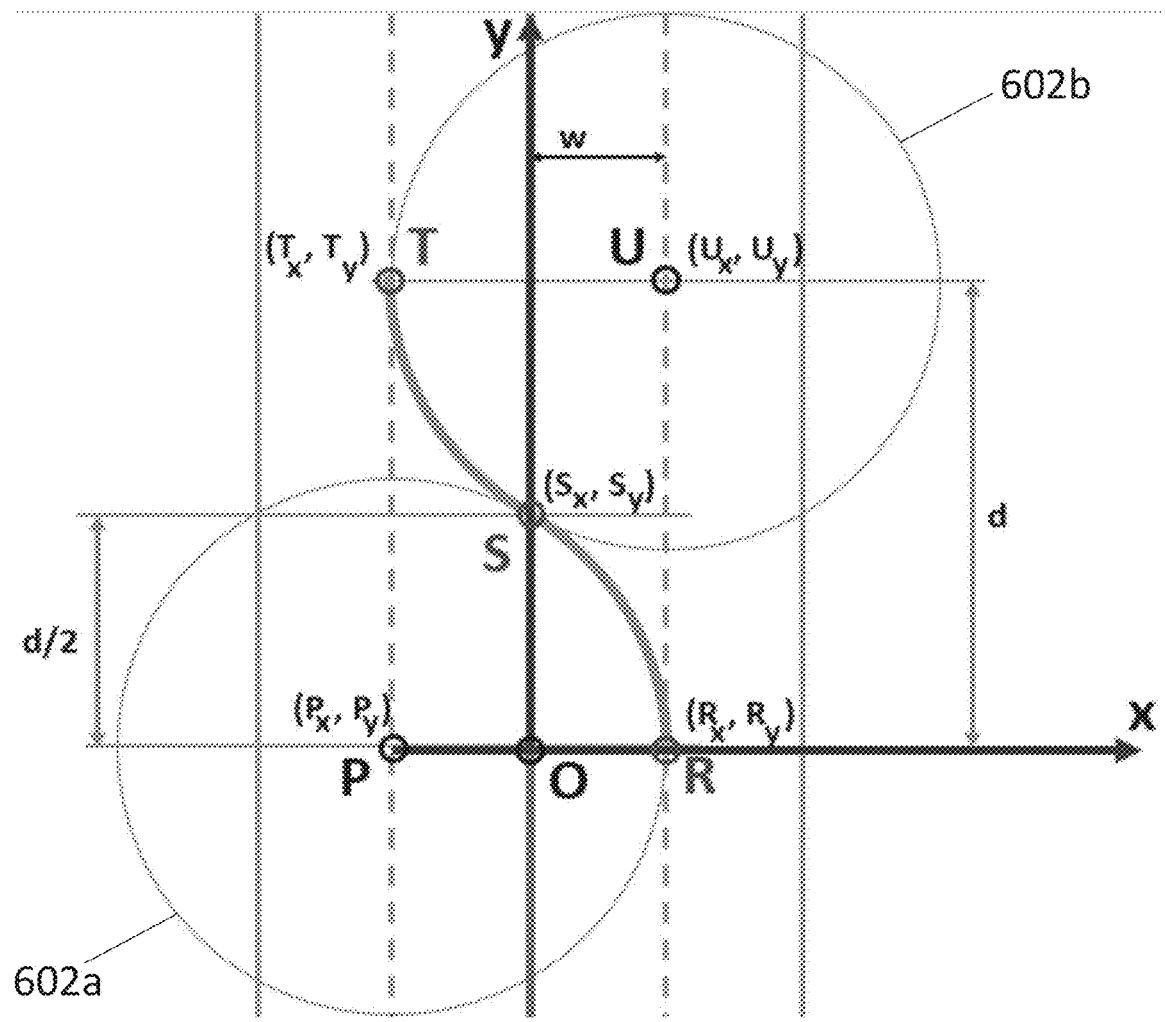
FIG. 5D is a schematic diagram of the application of FIG. 5A, showing the assumed geometry used for lane change of vehicle C (not to scale).

When the contingency alert arrives, autonomous vehicle C is travelling at a speed of 90 km/h and its back (chosen to have the same independent coordinate as the center of the system of coordinates) is at a distance of 198 m from the entrance of the tunnel 504. The necessary lane change will be executed along the trajectory RST (see FIGS. 5B and 5C), following the circumferences of two adjacent circles 602a and 602b, as shown in FIG. 5D. The parameters of lane change executed by autonomous vehicle C are computed from simple trigonometry and rigid body equations of motion. A 0.00018 fraction of the available torque is needed to maintain a constant velocity along the trajectory RST. The lane change requires turning left, following a circle with a radius of 3125 m, while travelling about 79 m at a constant velocity of 90 km/h and, then, to perform a corresponding right turn (see FIG. 5D, not to scale). The operation is executed in 6.3 s. Following a circular trajectory with a radius of 3125 m requires setting the control of steered wheels at (6/3125=0.00192) portion of the max setting of the steering system. After completing lane change, autonomous vehicle C needs to travel about 35 m at the some constant velocity, before entering the tunnel 504.

At the reception of the contingency alert, autonomous vehicle E is travelling at a velocity of 100 km/h and needs to slow down, in order to prepare space for autonomous vehicle C to merge into. Braking at 0.025 of available braking power makes it possible to slow down to 90 km/h during the 6.3 s—long autonomous vehicle C's lane changing operation, while covering about 166 m—. That will put autonomous vehicle E's front about lvUM=5 m behind autonomous vehicle C's back, satisfying the safe distance requirement.

At the same time, autonomous vehicle D, travelling at 93 km/h, needs to accelerate in order to make space for autonomous vehicle C without exceeding the maximum velocity of 120 km/h. The application of 0.00065 portion of available motor torque helps autonomous vehicle D to cover about 167 m during the 6.3 s period, what will put its back at a safe distance of lvUM=5 m from the front of vehicle autonomous C and at a distance of 25 m from tunnel entrance. The velocity of 93.2 km/h achieved at the end of the acceleration operation is lower than the motorway speed limit, but will require reduction, in order to comply with the speed limit of 90 km/h in the tunnel. That is accomplished with the application of 0.025 portion of the available braking power during 1 s.

Therefore, the contingency mitigation process begins with reception of a contingency alert and ends with execution of control or intent instructions sent directly to participating vehicles' control systems. Examples of those control instructions (TIDL instructions) may include, e.g.:

Hold Direction (nD), where "nD" is the portion of steered wheels setting needed to obtain a minimum permitted turning radius.

Hold Brakes (nB), where "nB" is the portion of maximum Brakes setting.

Hold Throttle (nT), where "nT" is the portion of maximum Throttle setting.

Trigger L(nL), execute the next operation after covering a distance of "nL".

In the example below, the operations are executed using a limited set of the available TIDL instructions: HD (Hold Direction), HT (Hold Throttle) and HB (Hold Brakes).

Figure 5E:
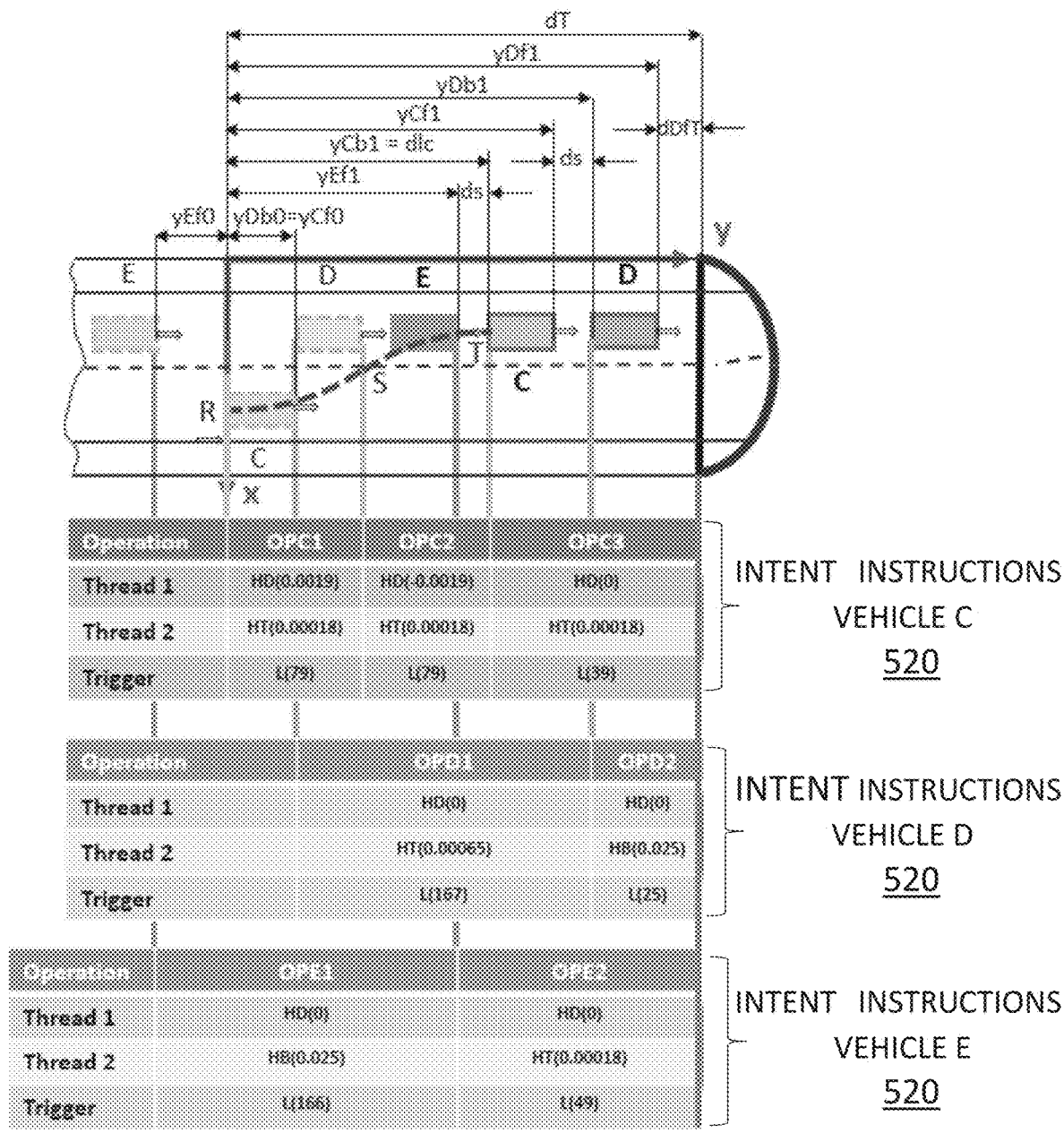
FIG. 5E is a schematic diagram of the application of FIG. 5A, showing the intent instructions for each participating vehicle produced by the disclosed system to address the exemplary emergency.

Autonomous vehicles C, D and E have collaboratively computed intent instructions 520 so that each of the autonomous vehicle of the network can avoid the anomalous traffic condition, or the effects of said condition are at least mitigated. The application of these intent instructions 520 to the control systems of each of the participating vehicles C, D and E, in order to achieve the negotiated solution, is shown in FIG. 5E. In this example, the intent instructions 520 for each vehicle C, D and E are shown in the form of a table, wherein each column refers to an operation and each row to a different thread (HD, HT or HB) or a trigger condition for the operation (last row).

For instance, column "OPC1" of table of intent instructions 520 for vehicle C is a first operation containing the instruction to hold direction at 0.0019 (a portion of the max setting of the steering wheel system) in a first thread corresponding to HD, and to hold the throttle at 0.00018 (a fraction of the maximum throttle). These instructions for the first operation, OPC1, are executed according to the corresponding trigger condition in the last row of the same column, in this case during 79 meters (L=79 m). As shown in the examples of patent document EP2930581-A, the trigger condition may be a length the vehicle needs to travel to finish the operation, or another type of condition, such as a timing (e.g. a certain amount of time that needs to pass to finish the operation) or a velocity that needs to be reached by the vehicle for the operation to finish.

Operations are successively executed. This way, once the trigger condition for the first operation (OPC1) has been fulfilled, the second operation (next column, OPC2) is being executed, and so on until all the operations have been performed.

Autonomous vehicles forming the wireless ad hoc network employ a secure communication protocol. Communication security is assured through a layered authentication process, as disclosed in European patent application No. 17382110.9 entitled "A system and a computer-implemented method for machine to machine authentication of an apparatus" and issued as patent No. EP3370386B1 on May 15, 2019, the content of which is herein incorporated by reference in its entirety. It is based on a new concept of "machine-metrics," analogous to "biometrics", which uses selected physical characteristics of a given component (e.g. vehicle dynamics parameters), and/or a sequential identification/authentication of critical on-board systems, such as communication equipment. These elements add an additional security layer to the authentication process.

FIG. 6 is a schematic diagram of an illustrative device for multi-factor (MFA) machine to machine (M2M) authentication. This figure is comparable to FIG. 1 of the above-noted application No. 17382110.9. Such authentication of the autonomous vehicles of the ad hoc network is the first step in the communication validation 306 of FIG. 3, as described above.

As depicted in the schematic diagram of FIG. 4, each emergency control device 410a includes an authentication device 460 configured to authenticate the autonomous vehicle 400a when establishing the wireless ad hoc network. The authentication device 460, represented in detail in diagram of FIG. 6, includes a retrieving unit 610, an acquiring unit 620 and a checking unit 630.

The retrieving unit 610 is configured to identify at least one critical component 602 of the autonomous vehicle 400a in response to an authentication request 606, and retrieve from a configuration database 640 authentication information 642 for the critical component 602. The authentication information 642 includes a plurality of expected physical and digital signatures as authentication factors for the critical component 602 and at least one additional component 604 associated therewith.

The acquiring unit 620 is configured to acquire present physical signatures by measuring and digital signatures for the critical component 602 and the at least one additional component 604. The checking unit 630 is configured to check, for each critical 602 and additional component 604, validity of each present physical and digital signature with the corresponding expected physical and digital signature. The checking unit 630 is further configured to authenticate the autonomous vehicle 400a, if physical and digital signatures for each component are valid. The output of the checking unit 630 is the authentication result 650.

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for traffic management of autonomous vehicles in emergency situations, comprising:
 upon reception by an autonomous vehicle of an emergency signal including information on an anomalous traffic condition, broadcasting the emergency signal using a wireless communication device;
 establishing a wireless ad hoc network among a plurality of autonomous vehicles receiving the emergency signal;
 exchanging data among the autonomous vehicles of the network, the exchanged data at least including on-board sensor data and intent of each autonomous vehicle of the network;
 collaboratively computing, by the autonomous vehicles of the network, intent instructions for each of the autonomous vehicles of the network to avoid or mitigate the anomalous traffic condition;
distributing the intent instructions among the autonomous vehicles of the network; and
executing, by each autonomous vehicle of the network, the corresponding intent instructions.

2. The method of claim 1, wherein the collaborative computation of intent instructions includes:
negotiating trajectory modifications among the autonomous vehicles of the network; and
translating the negotiated trajectory modifications for each autonomous vehicle of the network into operations coded using an intent description language.

3. The method of claim 2, wherein the collaborative computation of intent instructions includes:
determining, for each autonomous vehicle of the network, a level of impact of the anomalous traffic condition on the intent of the vehicle;
assigning a priority level to each autonomous vehicle of the network based on the level of impact;
determining initial trajectory modifications for each autonomous vehicle of the network with a priority level equal to or higher than a threshold; and
starting with the initial trajectory modifications, negotiating trajectory modifications among the autonomous vehicles of the network to avoid or mitigate the anomalous traffic condition.

4. The method of claim 2, wherein the collaborative computation of intent instructions includes determining distributed computational tasks to be performed by each autonomous vehicle of the network.

5. The method of claim 4, wherein the data exchanged among the autonomous vehicles of the network includes a report of computational and communications performance of each autonomous vehicle, and wherein the computational tasks are distributed among the autonomous vehicles of the network in dependence upon the reported computational and communications performance of each autonomous vehicle of the network.

6. The method of claim 5, wherein the step of establishing a wireless ad hoc network includes authenticating the autonomous vehicles receiving the emergency signal.

7. The method of claim 6, wherein the step of establishing a wireless ad hoc network further includes determining, among the authenticated autonomous vehicles, validated autonomous vehicles that are capable of contributing to the collaborative computation to avoid or mitigate the anomalous traffic condition;
wherein the autonomous vehicles forming the wireless ad hoc network are the validated autonomous vehicles.

8. The method of claim 7, wherein the authentication of each autonomous vehicle includes:
identifying at least one critical component of the autonomous vehicle in response to an authentication request;
retrieving authentication information for the critical component, wherein the authentication information includes a plurality of expected physical and digital signatures as authentication factors for the critical component and at least one additional component associated with the critical component;
acquiring present physical digital signatures for the critical component and the at least one additional component associated therewith; and
for each critical and additional component, checking validity of each present physical and digital signature with the corresponding expected physical and digital signature and authenticating the autonomous vehicle if physical and digital signatures for each component are valid.

9. The method of claim 8, further comprising:
repeatedly checking availability of all the autonomous vehicles forming the wireless ad hoc network; and
if one or more autonomous vehicles of the network become temporarily unavailable, updating the wireless ad hoc network to include only the autonomous vehicles available as participating nodes of the network.

10. The method of claim 9, wherein the data exchanged among the autonomous vehicles of the network includes at least one of the following:
the position of each autonomous vehicle,
the velocity of each autonomous vehicle,
the vehicle status,
computational performance of each autonomous vehicle,
communications performance of each autonomous vehicle,
mechanical parameters of each autonomous vehicle,
environmental information acquired by one or more sensors, including detected obstacles, detected vehicles, detected visibility and/or detected road surface condition, or
external data retrieved from a service or a remote server.

11. The method of claim 10, further comprising:
detecting, by an autonomous vehicle, an anomalous traffic condition; and
wirelessly transmitting, by the autonomous vehicle, an emergency signal including information related to the anomalous traffic condition.

12. A system for traffic management of autonomous vehicles in emergency situations, comprising:
a plurality of emergency control devices, each device adapted to be installed on-board an autonomous vehicle;
wherein each emergency control device is equipped with a wireless communication module, an intent description language module and a control unit configured to:
upon reception of an emergency signal including information related to an anomalous traffic condition, broadcast the emergency signal using the wireless communication module;
establish a wireless ad hoc network with those emergency control devices of the plurality of emergency control devices which are receiving the emergency signal;
exchange data with the rest of the emergency control devices of the network, the exchanged data at least including on-board sensor data and intent of the autonomous vehicle;
collaboratively compute, with the rest of the emergency control devices of the network, intent instructions for each autonomous vehicle to avoid or mitigate the anomalous traffic condition;
distribute the computed intent instructions to the rest of the emergency control devices of the network;
upon reception of intent instructions for the corresponding autonomous vehicle, decode said instructions using the intent description language module; and
execute the decoded intent instructions.

13. The system of claim 12, wherein each emergency control device further includes an anomalous traffic condition detection unit configured to detect an anomalous traffic condition;

wherein the control unit of each emergency control device is further configured to wirelessly transmit an emergency signal including information related to the detected anomalous traffic condition.

14. The system of claim 12, wherein each emergency control device further includes one or more sensors configured to acquire environmental information, wherein the data exchanged with the rest of the autonomous vehicles of the network includes the acquired environmental information.

15. The system of claim 12, wherein each emergency control device further includes an authentication device configured to authenticate the autonomous vehicle when establishing the wireless ad hoc network, the authentication device including:
   a retrieving unit configured to identify at least one critical component of the autonomous vehicle in response to an authentication request, and retrieve authentication information for the critical component, wherein the authentication information includes a plurality of expected physical and digital signatures as authentication factors for the critical component and at least one additional component associated therewith;
   an acquiring unit configured to acquire present physical and digital signatures for the critical component and the at least one additional component; and
   a checking unit configured to check, for each critical and additional component, validity of each present physical and digital signature with the corresponding expected physical and digital signature, the checking unit further configured to authenticate the autonomous vehicle if physical and digital signatures for each component are valid.

16. An emergency control device for traffic management of autonomous vehicles in emergency situations, adapted to be installed on-board an autonomous vehicle, comprising:
   a wireless communication module;
   an intent description language module; and
   a control unit configured to:
      upon reception of an emergency signal including information related to an anomalous traffic condition, broadcast the emergency signal using the wireless communication module;
      establish a wireless ad hoc network with other emergency control devices receiving the emergency signal;
      exchange data with the rest of the emergency control devices of the network, the exchanged data including at least on-board sensor data and intent of the autonomous vehicle;
      collaboratively compute, with the rest of emergency control devices of the network, intent instructions for each autonomous vehicle of the network to avoid or mitigate the anomalous traffic condition;
      distribute the computed intent instructions to the rest of the emergency control devices of the network;
      upon reception of intent instructions, decode said instructions using the intent description language module; and
      execute the decoded intent instructions.

17. The device of claim 16, further comprising an anomalous traffic condition detection unit configured to detect an anomalous traffic condition, wherein the control unit is further configured to wirelessly transmit an emergency signal including information related to the detected anomalous traffic condition.

18. The device of claim 16, further comprising one or more sensors configured to acquire environmental information, wherein the data exchanged with the rest of the emergency control devices of the network includes the acquired environmental information.

19. The device of claim 16, further comprising an authentication device configured to authenticate the autonomous vehicle when establishing the wireless ad hoc network, the authentication device including:
   a retrieving unit configured to identify at least one critical component of the autonomous vehicle in response to an authentication request, and retrieve authentication information for the critical component, wherein the authentication information includes a plurality of expected physical and digital signatures as authentication factors for the critical component and at least one additional component associated therewith;
   an acquiring unit configured to acquire present physical and digital signatures for the critical component and the at least one additional component; and
   a checking unit configured to check, for each critical and additional component, validity of each present physical and digital signature with the corresponding expected physical and digital signature, the checking unit further configured to authenticate the autonomous vehicle if physical and digital signatures for each component are valid.

20. The device of claim 16, wherein the collaborative computation of intent instructions includes negotiating trajectory modifications among the autonomous vehicles of the network to avoid or mitigate the anomalous traffic condition.

* * * * *